Feb. 11, 1969                A. R. OSBURN                3,426,972
              ROCKET MOTOR THRUST VECTOR CONTROL APPARATUS
                        Filed Aug. 16, 1966
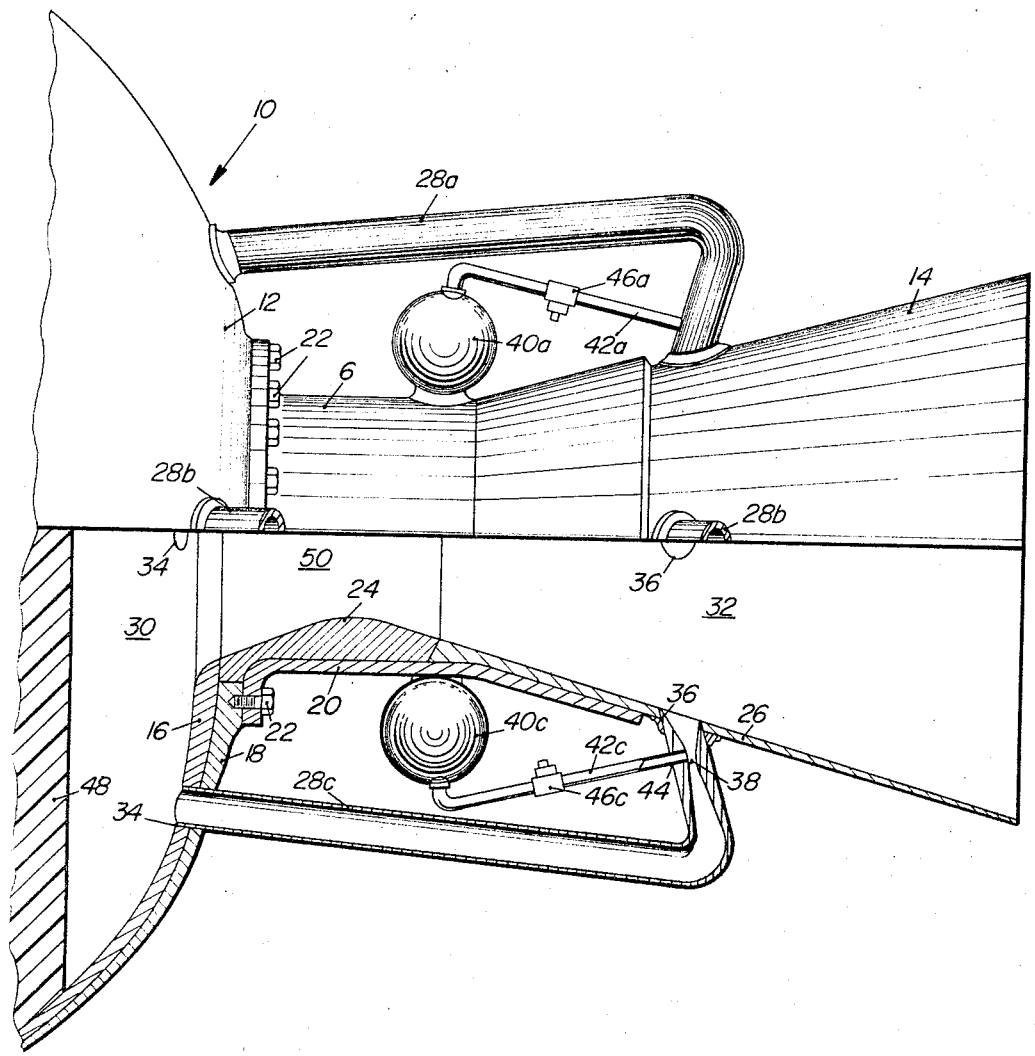
INVENTOR.
ALBERT R. OSBURN
BY  Edwin D. Grant
ATTORNEY

United States Patent Office 3,426,972
Patented Feb. 11, 1969

3,426,972
ROCKET MOTOR THRUST VECTOR
CONTROL APPARATUS
Albert R. Osburn, Brigham City, Utah, assignor to Thiokol Chemical Corporation, Bristol, Pa., a corporation of Delaware
Filed Aug. 16, 1966, Ser. No. 572,756
U.S. Cl. 239—8     6 Claims
Int. Cl. B63h 25/46, 11/10; B64c 15/04

ABSTRACT OF THE DISCLOSURE

A secondary fluid injection system for thrust vector control of rocket motors and the like includes a plurality of conduits connecting the interior of the rocket motor combustion chamber to the nozzle interior downstream of the throat. Means are also provided for injecting fluid, preferably liquid, into the conduit just upstream of conduit entry into the nozzle.

---

This invention relates to rocket motors and, more particularly, to an improved apparatus for controlling the thrust vector of a rocket motor.

In the art of guiding rockets, it is known that thrust vector control can be accomplished in solid propellant rocket motors by means of secondary injection, wherein a liquid or gas is injected into the exhaust stream flowing through the thrust nozzle of such a rocket motor. A disadvantage of known systems for secondary injection thrust vector control, however, is the relatively large quantities of fluid which they require to produce the desired degree of control. The use of gases diverted from the combustion chamber of a rocket as the injected fluid eliminates the problem of carrying a large separate quantity of fluid on the rocket for thrust vector control, but results in another problem since valves used to control the flow of gases from the combustion chamber to the thrust nozzle of the rocket are subjected to an extremely severe atmosphere and become inoperative after a short time.

As a solution to these problems, this invention provides a secondary injection system wherein hot gas is diverted from the combustion chamber of a rocket motor and fed continuously in the exit cone of its thrust nozzle through a plurality of conduits each having a constricted or venturi throat, and wherein the thrust vector of said rocket motor is changed by selectively introducing a liquid into the venturi throat of one of said conduits.

It is accordingly a broad object of this invention to provide an improved apparatus for varying the thrust vector of a rocket motor having an immovable thrust nozzle.

Another object of this invention is to provide an improved secondary injection method of varying the thrust vector of a rocket motor having an immovable thrust nozzle.

Still another object of this invention is to provide an apparatus for varying the thrust vector of a rocket motor having an immovable thrust nozzle, which apparatus produces thrust vectoring by means of secondary injection without requiring a large quantity of injection fluid.

An additional object of this invention is to provide a secondary injection rocket motor thrust vector control system the flow control valves of which are not made inoperative by the hot combustion gas utilized therein.

The above and other objects and advantages of the present invention will be more clearly understood by consideration of the following description of a preferred embodiment thereof, in which reference is made to the accompanying drawing which illustrates, partially in longitudinal section, said embodiment and the thrust nozzle and a portion of the casing of a rocket motor on which it is used.

Throughout the specification and drawing, the same reference numbers refer to the same parts.

In the drawing reference number 10 generally designates a rocket motor having a casing 12 on the aft end of which is fixedly mounted a thrust nozzle 14. Both casing 12 and thrust nozzle 14 are comprised of several fixedly joined components, the former having double walls 16, 18 and the latter having an outer, forward end portion 20, which is joined to wall 18 by a plurality of screws 22, and a throat insert 24 and exit cone 26 both of which are bonded to said portion 20. Four conduits 28a through 28d (only three of which are illustrated in the drawing) are evenly spaced around thrust nozzle 14 and each fixedly connected at one end to casing 12 and in communication with the combustion chamber 30 thereof, and fixedly connected at the other end to thrust nozzle 14 and in communication with the interior 32 thereof. More particularly, one end of each conduit 28a through 28d is positioned within one of four apertures 34 (only two of which are illustrated) formed in the aft end of casing 12 and evenly spaced circumferentially thereof, and the other end of each of said conduits is positioned within one of four apertures 36 (only two of which are illustrated) formed in exit cone 26 and evenly spaced circumferentially thereof. Each conduit 28a through 28c is formed with a venturi throat 38 adjacent the end thereof that is connected to thrust nozzle 14.

Fixedly mounted on the forward end portion 20 of thrust nozzle 14 are four tanks 40a through 40d (only two of which are illustrated), these tanks being evenly spaced about said thrust nozzle and, when the described apparatus is in use, being filled with dichlorodifluoromethane. Preferably the liquid held within each tank 40 is pressurized by gas or other suitable means. A duct 42a through 42d is fixedly connected at one end to each of the tanks 40a through 40d so as to communicate with the interior thereof, the other end of said duct being fixedly positioned within an aperture 44 formed in the wall of each conduit 28a through 28d at the venturi throat 38 thereof. In each duct 42a through 42d is a valve 46a through 46d which can be actuated from a remote point by conventional means (not shown) to open or close the passage in said duct.

In the preferred embodiment of the invention herein described, rocket motor 10 is provided with a solid propellant charge 48 which, when ignited, produces a high-temperature gas most of which passes directly through the throat 50 of thrust nozzle 14 and a small portion of which flows through conduits 28 and is discharged laterally into the exhaust stream at exit cone 26. Thrust vector control is effected by selectively opening valves 46a through 46d to thereby disturb the balanced forces acting against thrust nozzle 14 as a result of continuous flow of gas through each of the four conduits 28a through 28d into the exhaust stream. For example, valve 46c can be actuated to allow liquid to flow from tank 40c through duct 42c into the venturi throat of conduit 28c. Since the flow of gas through the venturi throat 38 produces a diminished pressure at this portion of conduit 28c, only a relatively low pressure is required in tank 40c to inject liquid into said conduit. The liquid that enters the hot gas flowing through conduit 28c is injected with said gas into the exhaust stream adjacent the end of said conduit, thereby producing an imbalance in the forces acting laterally upon thrust nozzle 14 and changing the thrust vector of rocket motor 10. Because of the high velocity of the gas within conduit 28c, the liquid from duct 42c penetrates deeply into the exhaust stream flowing through exit cone 26, and a maximum surface of said liquid is exposed to the gas stream for vaporization, thus resulting in a high localized pressure within said exit cone. Consequently, a relatively small amount of liquid from tanks 40a through 40d is required to produce large thrust vectoring forces against thrust nozzle 14. Since the hot gas diverted from combustion chamber 30 for the purpose of thrust vector control does not pass through valves 46a through 46d, these valves can be reliably operated throughout the flight of rocket motor 10. Furthermore, the introduction of liquid from tanks 40a through 40d into conduits 28a through 28d at the venturi throat 38 thereof eliminates the need for high-pressure injection means for this liquid and thus provides a simplified, lightweight secondary injection thrust vector control apparatus.

It will be recognized by persons skilled in the art of rocket motors that the components of the described embodiment of the invention can be fabricated of many well-known materials. Obviously many modifications and variations of the present invention are possible in the light of the above teachings, and it is therefore to be understood that, within the scope of the appended claims, the invention may be practiced otherwise than as specifically described.

What is claimed is:

1. In a rocket motor having a thrust nozzle fixedly mounted on the casing thereof, thrust vector control apparatus comprising:
    a plurality of conduits spaced around said thrust nozzle and each fixedly connected at one end to said casing and in communication with the combustion chamber thereof, and fixedly connected at the other end to said thrust nozzle and in communication with the interior thereof, said conduit other end each formed with a venturi including a throat; and
    injection means mounted on said rocket motor for selectively injecting fluid into each of said conduits comprising, at least one tank containing fluid under pressure, a plurality of ducts each connected to said tank and to a respective one of said conduits for conveying said fluid in said tank directly to a respective one of said venturi throats, and a control valve in each of said ducts for controlling the rate of fluid from said tank to each of said venturi throats.

2. The thrust vector control apparatus of claim 1 wherein the fluid under pressure in said tank is a liquid.

3. The thrust vector control apparatus of claim 1 wherein the fluid under pressure is dichlorodifluoromethane.

4. A method for varying the direction of the thrust vector of a rocket motor having a thrust nozzle fixedly mounted on the casing thereof, comprising:
    continuously drawing off high temperature gas from the combustion chamber of said rocket motor into a plurality of conduits;
    discharging said gas within each of said conduits into the interior of said thrust nozzle through venturi throats formed in said conduits;
    selectively conveying fluid under pressure from at least one tank through a plurality of ducts to the interior of each of said conduits; and,
    discharging said fluid in said ducts into said high temperature gas in said conduits directly into the venturi throats formed therein.

5. The method of claim 4 wherein said fluid under pressure is a liquid.

6. The method of claim 4 wherein said fluid under pressure is dichlorodifluoromethane.

References Cited

UNITED STATES PATENTS

| | | | |
|---|---|---|---|
| 3,147,590 | 9/1964 | Thielman | 239—265.17 X |
| 3,195,303 | 7/1965 | Widell | 239—265.23 X |
| 3,255,971 | 6/1966 | Widell | 239—265.23 |

M. HENSON WOOD, JR., *Primary Examiner.*

J. P. MULLINS, *Assistant Examiner.*

U.S. Cl. X.R.

239—265.17, 265.23; 60—231; 244—52